(12) United States Patent
Livshits et al.

(10) Patent No.: US 9,747,448 B2
(45) Date of Patent: Aug. 29, 2017

(54) CRYPTOGRAPHIC MECHANISMS TO PROVIDE INFORMATION PRIVACY AND INTEGRITY

(71) Applicant: Microsoft Technology Licensing, LLC, Redmond, WA (US)

(72) Inventors: Benjamin Livshits, Kirkland, WA (US); Matthew Fredrikson, Madison, WI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 552 days.

(21) Appl. No.: 14/032,065

(22) Filed: Sep. 19, 2013

(65) Prior Publication Data

US 2014/0298455 A1    Oct. 2, 2014

Related U.S. Application Data

(60) Provisional application No. 61/807,436, filed on Apr. 2, 2013.

(51) Int. Cl.
  *G06F 21/57*    (2013.01)
  *G06F 21/12*    (2013.01)
  *H04L 9/32*     (2006.01)

(52) U.S. Cl.
  CPC ............ *G06F 21/57* (2013.01); *G06F 21/125* (2013.01); *H04L 9/3221* (2013.01); *H04L 2209/50* (2013.01); *H04L 2209/76* (2013.01)

(58) Field of Classification Search
  CPC ..... G06F 21/57; G06F 21/125; H04L 9/3221; H04L 2209/50; H04L 2209/76
  See application file for complete search history.

(56) References Cited

U.S. PATENT DOCUMENTS

| 8,667,292 | B2* | 3/2014 | Danezis | H04L 9/3247 |
| | | | | 700/291 |
| 9,111,071 | B2* | 8/2015 | Kerschbaum | G06F 21/125 |
| 2002/0013777 | A1* | 1/2002 | Diener | H04M 3/2263 |
| 2006/0130021 | A1* | 6/2006 | Plum | G06F 11/3624 |
| | | | | 717/140 |
| 2008/0271001 | A1* | 10/2008 | Nonomura | G06F 21/125 |
| | | | | 717/143 |

(Continued)

OTHER PUBLICATIONS

Car, Boran, "Implementation and Evaluation of Zero-Knowledge Proofs of Knowledge", 2012, 65 pages.*

(Continued)

*Primary Examiner* — Michael Pyzocha
(74) *Attorney, Agent, or Firm* — Lee & Hayes, PLLC

(57) ABSTRACT

A security engine may be selected from a plurality of security engines to apply one or more security mechanisms to a section of source code of an application. In some cases, the section of source code may be identified by one or more security mechanism identifiers included in the source code. The security engine may generate machine-readable code that corresponds to the section of source code for which the one or more security mechanisms are to be applied. The machine-readable code may be executed on a plurality of computing devices. In one implementation, applying the security mechanisms to the section of source code may include producing zero-knowledge proofs of knowledge for the section of source code.

20 Claims, 7 Drawing Sheets

(56) References Cited

U.S. PATENT DOCUMENTS

| | | | | |
|---|---|---|---|---|
| 2012/0005098 A1* | 1/2012 | Gross | ............... | G06F 21/31 |
| | | | | 705/50 |
| 2012/0089494 A1* | 4/2012 | Danezis | ............ | G06Q 20/102 |
| | | | | 705/34 |
| 2012/0290843 A1 | 11/2012 | Belenky | | |
| 2013/0086625 A1* | 4/2013 | Driscoll | ............. | G06F 21/52 |
| | | | | 726/1 |

OTHER PUBLICATIONS

McCall, John, "Zero Knowledge Compilers", UMM CSci Senior Seminar Conference, Dec. 2013 Morris, MN., pp. 1-6.*

Chong, et al., "Secure Web Applications via Automatic Partitioning", In Proceedings of Twenty-First ACM SIGOPS Symposium on Operating Systems Principles, vol. 41, Issue 6, Oct. 14, 2007, pp. 31-44.

"International Search Report and Written Opinion Issued in PCT Application No. PCT/US2014/032447", Mailed Date: Nov. 26, 2014, 12 Pages.

Kiciman, et al., "AjaxScope: A Platform for Remotely Monitoring the Client-Side Behavior of Web 2.0 Applications", In Proceedings of Twenty-First ACM SIGOPS Symposium on Operating Systems Principles, vol. 41, Issue 6, Oct. 14, 2007, pp. 17-30.

Manolescu, et al., "Volta: Developing Distributed Applications by Recompiling", In IEEE Software, vol. 25, Issue 5, Sep. 2008, pp. 53-59.

PCT International Preliminary Report on Patentability for Application No. PCT/US2014/032447, mailed Jul. 13, 2015, 10 pgs.

Bacelar, et al., A Certifying Compiler for Zero-Knowledge Proofs of Knowledge Based on $\Sigma$-Protocols, In Proceedings of the 15th European Conference on Research in Computer Security, Sep. 20, 2010, 22 pages.

Bacelar, et al., "Full Proof Cryptography: Verifiable Compilation of Efficient Zero-Knowledge Protocols", In Proceedings of the ACM Conference on Computer and Communications Security, Oct. 16, 2012, 18 Pages.

Backes, et al., "Achieving Security Despite Compromise Using Zero-knowledge", In Proceedings of the 22nd IEEE Computer Security Foundations Symposium, Jul. 8, 2009, 18 Pages.

Bangerter, et al., "Bringing Zero-Knowledge Proofs of Knowledge to Practice", In 17th International Workshop on Security Protocols, Apr. 1, 2009, 12 pages.

Camenisch, et al.,"A Framework for Practical Universally Composable Zero-Knowledge Protocols", In 17th International Conference on the Theory and Application of Cryptology and Information Security, Dec. 4, 2011, 30 Pages.

Danezis, et al., "ZQL A Cryptographic Compiler for Processing Private Data", Feb. 2012, 30 pages.

Fournet, et al., "ZQL: A Compiler for Privacy-Preserving Data Processing", In Microsoft Technical Report, MSR TR-2013-25, Feb. 2013, 20 Pages.

Lu, et al., "Pseudo Trust: Zero-Knowledge Authentication in Anonymous P2Ps", In IEEE Transactions on Parallel and Distributed Systems vol. 19, Issue 10, 2008-10, 13 Pages.

Meiklejohn, et al., "ZKPDL: A Language-Based System for Efficient Zero-Knowledge Proofs and Electronic Cash", In Proceedings of the 19th USENIX Conference on Security, 2010-08-11, 14 Pages.

Parno, et al., "Pinocchio: Nearly Practical Verifiable Computation", Proceedings of the IEEE Symposium on Security and Privacy, May 2013, 15 Pages.

* cited by examiner

```
1  public class LoyaltyCard : DistributedRuntime
2  {
3  // Local variable declarations
4  [ Location ( Client )] IEnumerable <int > shophist ;
5  [ Location ( Client )] IEnumerable <int > items ;
6  IEnumerable <Triple> automata ;
7  IEnumerable <Pair > transducer ;
8
9  public void Initialize ( string [] args )
10 {...}
11
12 public void DoWork ( string [] args )
13 {
14 var discount =
15 GetDiscounts ( shophist , items ,
16 automata , transducer );
17 ApplyDiscount ( discount );
18 }
19
20 [ Location ( Client )]
21 IEnumerable <Pair > GetDiscounts (
22 [ MaxSize ( Purchases )] IEnumerable <int > history ,
23 [ MaxSize ( Items )] IEnumerable <int > items ,
24 [ MaxSize ( Edges )] IEnumerable < Triple > automata ,
25 [ MaxSize ( States )] IEnumerable <Pair > transducer )
26 {
27 ZeroKnowledgeBegin ();
28 // Check that the history is in ascending order
29 var historyAscendingCheck = history . Aggregate (
30 0,
31 (last , curel ) => check ( last <= curel ));
32 // Get the " discount state "
33 var purch_state = history . Aggregate (
34 0,
35 (state , purch ) =>
36 automata . First (
37 trans => ( trans . fld (1) == state ) &&
38 ( trans . fld (2) == purch )).
39 fld (3));
40 var discount = history . Aggregate (
41 new Pair ( purch_state , 0),
42 (state , purch ) =>
43 new Pair (
44 // Get the next automata state
45 automata . First (
46 trans => ( trans . fld (1) == state .fld (1))
47 && ( trans .fld (2) == purch )).
48 fld (3) ,
49 // Total the current state discount
50 state .fld (2) + transducer . First (
51 edge => edge . fld (1) == state . fld (1)));
52 ZeroKnowledgeEnd ();
53
54 return new IEnumerable <Pair >( discount );
55 }
56
57 [ Location ( External )] void ApplyDiscount (...)
58 {...}
59 }
```

```
┌─────────────────────────────────────────────────────────────┐
│  IDENTIFY A SECTION OF SOURCE CODE OF AN APPLICATION FOR    │
│    WHICH TO APPLY ONE OR MORE SECURITY MECHANISMS           │
│                         402                                 │
└─────────────────────────────────────────────────────────────┘
                              ↓
┌─────────────────────────────────────────────────────────────┐
│      DETERMINE THAT A SECURITY ENGINE OF A PLURALITY OF     │
│    SECURITY ENGINES IS TO APPLY THE ONE OR MORE SECURITY    │
│          MECHANISMS TO THE SECTION OF SOURCE CODE           │
│                         404                                 │
└─────────────────────────────────────────────────────────────┘
                              ↓
┌─────────────────────────────────────────────────────────────┐
│       OBTAIN MACHINE-READABLE CODE STATEMENTS FROM THE      │
│           SECURITY ENGINE, THE MACHINE-READABLE CODE        │
│    STATEMENTS BEING EXECUTABLE TO IMPLEMENT THE ONE OR MORE │
│  SECURITY MECHANISMS WITH RESPECT TO THE SECTION OF THE SOURCE CODE │
│                         406                                 │
└─────────────────────────────────────────────────────────────┘
                              ↓
┌─────────────────────────────────────────────────────────────┐
│    DETERMINE THAT A FIRST PORTION OF THE MACHINE-READABLE   │
│   CODE STATEMENTS ARE TO BE EXECUTED BY A FIRST COMPUTING   │
│  DEVICE AND A SECOND PORTION OF THE MACHINE-READABLE CODE   │
│   STATEMENTS ARE TO BE EXECUTED BY A SECOND COMPUTING DEVICE│
│                         408                                 │
└─────────────────────────────────────────────────────────────┘
```

FIG. 4

CRYPTOGRAPHIC MECHANISMS TO PROVIDE INFORMATION PRIVACY AND INTEGRITY

PRIORITY CLAIM AND CROSS-REFERENCE TO RELATED APPLICATION

This application claims the benefit of, and priority to, U.S. Provisional Patent Application No. 61/807,436, filed Apr. 2, 2013, which is incorporated by reference herein in its entirety.

BACKGROUND

Applications increasingly rely on privacy-sensitive user data, but storing user's data in the cloud creates challenges for the application provider. For example, application providers may have to deal with concerns that arise relating to the possibility of data leaks and respond to regulatory pressure and/or public pressure to provide privacy for users' data. In some cases, application providers have chosen to move functionality to the client to reduce privacy concerns because execution on the client can provide a degree of privacy with respect to computations, with only relevant data being disclosed to another computing device, such as a remote server. However, in many cases moving functionality to the client conflicts with a need for computational integrity. To illustrate, a malicious client can forge the results of a computation before sending data to an additional computing device. Typically, privacy and integrity have been two desirable design goals that have been difficult to integrate.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

This application is directed to optimizing security engines to apply one or more security mechanisms to a section of source code of an application. In some cases, the section of source code may be identified by one or more security mechanism identifiers included in the source code. The security engine may generate machine-readable code that corresponds to the section of source code for which the one or more security mechanisms are to be applied. The machine-readable code may be executed on a plurality of computing devices. In one implementation, the security engines may produce zero-knowledge proofs of knowledge for the section of source code to provide privacy and integrity with respect to user data and calculations associated with the section of source code.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

FIG. 2 illustrates example source code for an application that includes portions that are subject to privacy processes and integrity processes according to some implementations.

FIG. 4 illustrates a flow diagram of an example method to determine a security engine of a plurality of security engines to implement one or more security mechanisms to a section of source code according to some implementations.

DETAILED DESCRIPTION

Figure 1:
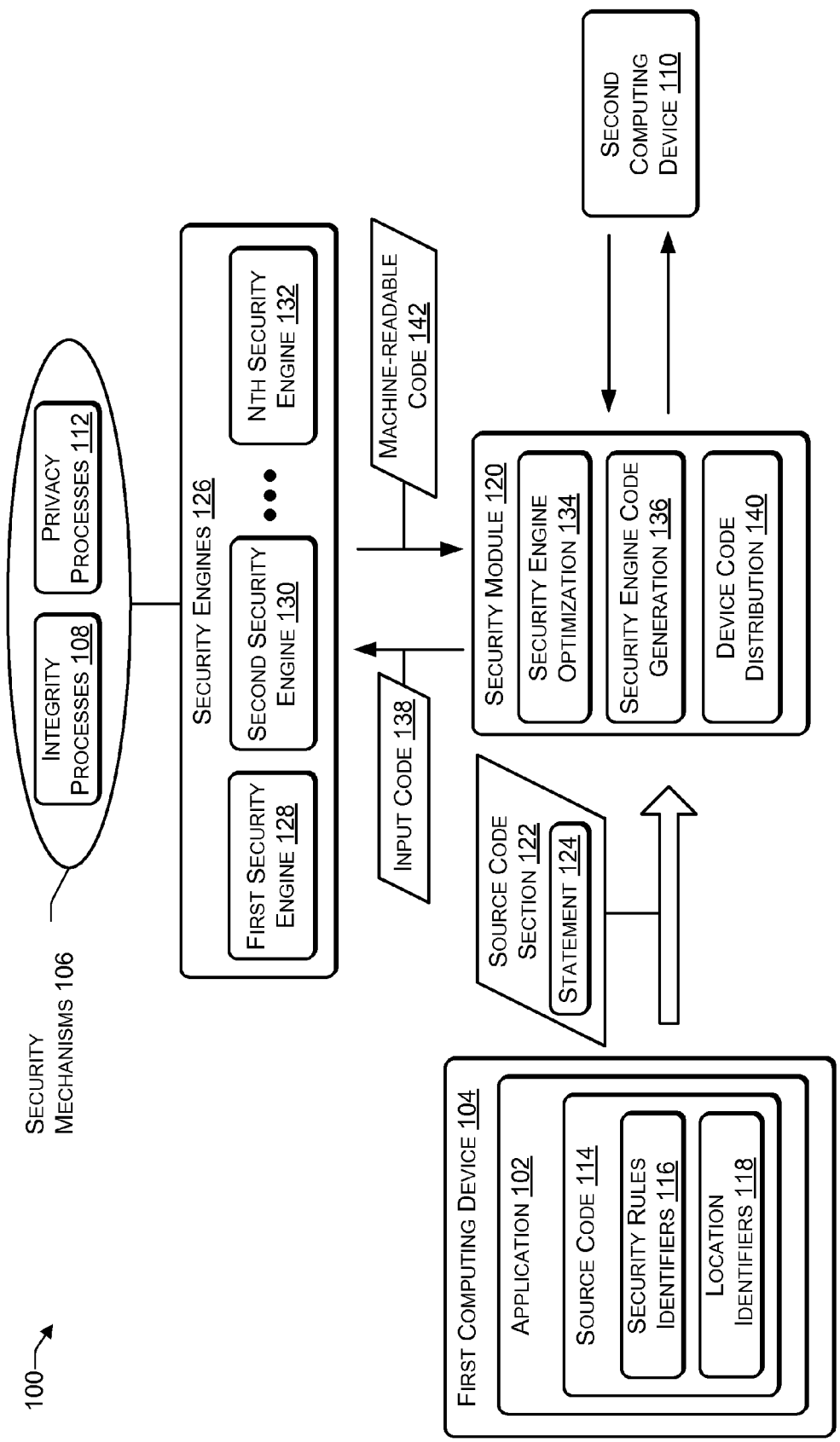
FIG. 1 illustrates an example framework to implement privacy processes and integrity processes for an application according to some implementations.

The technologies described herein are generally directed to providing privacy of data and integrity of computation utilized by various applications. In particular, data associated with calculations for an application may remain on a client device to provide privacy regarding the data. Additionally, the integrity of calculations performed with respect to the data may be verified by optionally providing proofs for the results of the calculations.

In an implementation, a first entity may perform calculations, provide a service, or otherwise utilize data received from a second entity. In an illustrative example, an insurance company may offer vehicle insurance to customers based on a number of miles that the customers have driven. In this situation, a metering device associated with the customer may track a number of miles that the customer has driven over a given period of time. However, the customer may not want to provide all of the mileage data to the insurance company because the insurance company may be able to track the customer's location based on their home address, work address, etc. and the mileage data provided by the customer. To preserve a customer's privacy, billing calculations may be performed by a computing device of the customer according to the mileage data collected by the metering device for the customer. To verify the integrity of the billing calculations provided to the insurance company, security mechanisms, such as zero-knowledge proofs of knowledge calculations, can be applied before results of the billing calculations are provided to the insurance company. In this way, the privacy of the customer is maintained due to the precise mileage data remaining on the computing device of the customer, while the service provider receives accurate data needed for billing and is ensured of the integrity of the calculations performed by the electronic device of the customer based on the security mechanisms being applied to the calculations. Accordingly, the level of trust between the customer and the service provider is preserved.

The present disclosure includes implementations that utilize integrity processes and privacy processes to provide privacy for individuals with respect to data collected about the individuals, while verifying the integrity of calculations performed using the data. The collection of data and the calculations implemented with respect to the data may be performed in conjunction with a particular application residing on a computing device. The integrity processes and privacy processes may be implemented by a number of security engines that each utilize respective cryptographic techniques. A security module may perform an optimization based on performance models for each security engine to determine particular security engines to implement the integrity processes and privacy processes with respect to specified portions of the application.

In particular implementations, zero-knowledge proofs of knowledge may be utilized to implement the integrity processes and privacy processes. For example, zero-knowledge proofs of knowledge may be utilized to provide privacy and integrity features regarding the data and calculations performed with respect to the data for a particular application. Zero-knowledge proofs of knowledge utilize cryptographic proofs to verify the integrity of calculations performed with respect to a particular set of data. In many situations, though, zero-knowledge proofs of knowledge can be difficult for developers to integrate into their applications due to the complicated algorithms that produce zero-knowledge proofs of knowledge. Further, calculations performed to produce zero-knowledge proofs of knowledge have not been implemented in many scenarios because the length of time taken to produce the zero-knowledge proofs of knowledge calculations is too long to be practical.

In some implementations, the security module described herein may include a compiler that parses the source code or bytecode of an application and identifies sections of the application for which to apply privacy processes and integrity processes. The compiler may then perform an optimization to determine one or more security engines of a number of possible security engines to utilize to implement the privacy processes and the integrity processes. Subsequently, the compiler may provide the sections of source code to the one or more security engines to apply the privacy processes and the integrity processes based on the optimization performed by the security module. The sections of source code of an application that the privacy processes and the integrity processes are applied to may be specified by security mechanism identifiers included in the source code of the application. In this way, developers may simply include identifiers in source code that are recognized by the compiler, and the compiler can call the security engines to implement the privacy processes and the integrity processes to the specified sections of the source code. Thus, developers can have privacy processes and integrity processes implemented with respect to sections of their applications indicated declaratively, without worrying about the complex algorithms to apply the privacy processes and integrity processes.

Additionally, the optimization of the security engines utilized to implement the privacy processes and integrity processes to portions of the application may reduce the amount of time taken to implement the privacy processes and integrity processes since some security engines may be more efficient in implementing the privacy processes and integrity processes in particular situations than other security engines. Accordingly, applying security techniques, such as zero-knowledge proofs of knowledge, to sections of source code of applications may become more viable and widespread as the time taken to implement privacy processes and integrity processes to applications decreases.

Framework for Enforcing Security Mechanisms

FIG. 1 illustrates an example framework 100 to enforce privacy processes and integrity processes for an application according to some implementations. The framework 100 includes an application 102 that may include instructions executable by a processor to perform a number of operations. The application 102 may be stored in memory of a first computing device 104. The first computing device 104 may include a mobile phone, a laptop computing device, a desktop computing device, a tablet computing device, a server computing device, a personal item (e.g., a watch, eyeglasses), an appliance, or a combination thereof.

In an implementation, the application 102 can be associated with security mechanisms 106. In some cases, the security mechanisms 106 may be used to preserve the privacy and integrity of data utilized by the application 102. Additionally, the security mechanisms 106 may be used to preserve the privacy and integrity of results of calculations performed with respect to the application 102.

In a particular implementation, the security mechanisms 106 may include integrity processes 108 that are applied to certify that results of calculations performed with respect to the application 102 are accurate. In this way, additional computing devices receiving the results of operations performed with respect to the application 102, such as second computing device 110, may rely on the results for additional operations that may be performed by the additional computing devices. In addition, the security mechanisms 106 may include privacy processes 112 that are applied to ensure that particular content is confidential. For example, in some situations, the privacy processes 112 may be applied such that particular data (e.g., values of variables, results of calculations) is to remain on the computing device 104 and not be sent to another computing device. In another example, the privacy processes 112 may be applied in a way that particular data associated with the application 102 is to remain on the computing device 104 until particular cryptographic techniques are applied to the particular data. In another situation, the privacy processes 112 may be implemented such that particular data is to be accessible by one or more computing devices associated with a specified entity (e.g., a specified company, a specified individual, a specified group of individuals), but is not accessible by a computing device associated with a different entity or is not accessible by a computing device associated with a different entity until particular cryptographic techniques are applied to the particular data. In an additional example, the privacy processes 112 may be implemented in a way that the source or a user associated with particular data is to remain anonymous.

The application 102 may include source code 114 that includes text expressions that may be translated into machine-readable instructions for execution by a processor. In some cases, the source code 114 may be converted into machine-readable instructions by a compiler. The source code 114 may be written according to a syntax of a particular computer programming language, such as C, C#, C++, Java, JavaScript, and the like. Additionally, the source code 114 may be written according to a particular computer programming language framework, such as the .NET framework. The source code 114 may include declarations of one or more variables utilized by the application 102, one or more functions of the application 102, one or more calls to functions of the application 102, one or more operators utilized by the application 102, one or more statements of the application 102, definitions of one or more types utilized by the application 102 (e.g., storage space requirements, value parameters, authorized operations, run-time memory allocations, etc.), combinations thereof, and the like.

In some cases, the source code 114 may include a variation or a subset of a particular programming language, such as a variation or subset of C# or a variation or subset of Java. For example, the source code 114 may include one or more types that are not included in a standard programming language. In an illustrative situation, the one or more types that are not included in the standard programming language may replace one or more types of the standard programming language.

In particular implementations, the source code 114 may include one or more security mechanism identifiers 116 that indicate portions of the source code 114 to apply the security mechanisms 106. In some cases, the security mechanism identifiers 116 may include a first security mechanism identifier 116 that indicates the beginning of a section of the source code 114 for which to apply the security mechanisms 106, and a second security mechanism identifier 116 that indicates the end of a section of the source code 114 for which to apply the security mechanisms 106.

In an implementation, the portions of the source code 114 bounded by beginning and ending security mechanism identifiers 116 may include statements having a particular syntax. To illustrate, the portions of the source code 114 that are subject to the security mechanisms 106 may include one or more Language-Integrated Query (LINQ) statements. In some cases, each of the statements of one or more functions included in portions of the source code 114 bounded by beginning and ending security mechanism identifiers 116 may include LINQ statements. Additionally, portions of the source code 114 for which to apply the security mechanisms 106 may be free from some features of the computer programming language of the source code 114. For example, portions of the source code 114 that are subject to the security mechanisms 106 may be free from reference expressions, loop expressions, conditional expressions, combinations thereof, and the like. In this way, the portions of the source code 114 that are subject to the security mechanisms 106 may be expressed in a subset of a particular computer programming language.

The source code 114 may also include one or more location identifiers 118 that indicate variables of the source code 114 that are subject to particular privacy processes 112. In addition, the source code 114 may also include additional identifiers. In one example, the source code 114 may include one or more identifiers that indicate a threshold value for a variable of the source code 114, such as a maximum size identifier. In an illustrative implementation, the security mechanism identifiers 116, the location identifiers 118, additional identifiers of the source code 114, or a combination thereof, may include specified strings of characters and/or symbols, such as a string of one or more alphanumeric characters.

The framework 100 may also include a security module 120 configured to apply the security mechanisms 106 to portions of the source code of an application, such as the source code 114 of the application 102. In some scenarios, the security module 120 may reside on the first computing device 104. Additionally, the security module 120 may include a compiler that translates at least a portion of the source code 114 to machine-readable code.

In an implementation, the security module 120 may parse the source code 114 to identify the security mechanism identifiers 116 indicating one or more portions of the source code 114 that are subject to the security mechanisms 106. The security module 120 may then obtain the one or more portions of the source code 114 that are subject to the security mechanisms 106, such as the source code portion 122. The source code portion 122 may include one or more statements of the source code 114, such as statement 124. The security module 120 may provide the portions of the source code 114 that are subject to the security mechanisms 106 to one or more security engines 126. In a particular implementation, the framework 100 includes a plurality of security engines 126, such as a first security engine 128, a second security engine 130, and an $N^{th}$ security engine 132, that may be accessible to the security module 120. In some instances, the security engines 126 may reside on the same computing device as the security module 120. For example, the security module 120 and the security engines 126 may reside on the first computing device 104. In other implementations, the security engines 126 and the security module 120 may reside on separate devices.

The security engines 126 may generate machine-readable code to implement the security mechanisms 106 with respect to specified portions of the source code 114 received from the security module 120. In some cases, the security engines 126 may implement the security mechanisms 106 by generating one or more keys, one or more cryptographic proofs, or both. In one example, the security engines 126 may generate machine-readable code corresponding to zero-knowledge proofs of knowledge for the source code portion 122.

In a particular implementation, the security module 120 may translate the portions of the source code 114 that are subject to the security mechanisms 106 from a computer programming language of the source code 114 to a computer programming language readable by one or more of the security engines 126. In one example, one or more of the security engines 126 may include compilers that accept an input computer programming language that is different from the computer programming language of the source code 114. In some cases, at least a portion of the security engines 126 may accept input computer programming languages that are different from each other. To illustrate, the first security engine 128 may accept input code of a first computer programming language and the second security engine 130 may accept input code of a second computer programming language. In an illustrative example, the input code of the first security engine 128 may be expressed in the metalanguage (ML) computer programming language. In another illustrative example, the input code of the second security engine 130 may be expressed in a C programming language.

Additionally, the security engines 126 may apply the security mechanisms 106 with respect to portions of the source code 114 according to one or more techniques. For example, the first security engine 128 may apply the security mechanisms 106 to portions of the source code 114 using cryptographic primitives. In an additional example, the second security engine 130 may apply the security mechanisms 106 to portions of the source code 114 by producing circuit representations that are converted into quadratic programs. In some situations, the circuit representations may include Boolean circuit representations, arithmetic circuit representations, or both.

In some cases, the different techniques utilized by the security engines 126 may be more efficient with respect to certain types of statements and/or functions of the application 102. In one example, the first security engine 128 may be more efficient than the second security engine 130 in applying the security mechanisms 106 in association with calculations performed over unbounded tables with respect to particular data included in the unbounded tables. In another example, the second security engine 130 may be more efficient than the first security engine 128 in applying the security mechanisms 106 to portions of the application 102 with respect to calculations involving conditional expressions and calculations performed over a defined set of data.

Further, the security module 120 may, at 134, perform security engine optimization to identify one or more of the security engines 126 to apply the security mechanisms 106 to portions of the source code 114. For example, the security module 120 may generate models for each of a number of the security engines 126 to determine one or more of the security engines 126 that most efficiently implement the security mechanisms 106 for one or more statements of the source code 114. To illustrate, the security module 120 may generate a first performance model for the first security engine 128 to implement the security mechanisms 106 for one or more statements of the source code 114 and a second performance model for the second security engine 130 to implement the security mechanisms 106 for the one or more statements of the source code 114. In a particular implementation, the performance models generated by the security module 120 may include polynomials over the size of input data for the one or more statements of the source code 114. In some cases, the results of the performance models may include estimates of a time taken to apply the security mechanisms 106 to specified portions of the source code 114. In other cases, the results of the performance models may include estimates for a number of operations performed to apply the security mechanisms 106 to the specified portions of the source code 114. In various implementations, the results of the performance models may include estimates of an amount of time and/or a number of operations used to generate zero-knowledge proofs of knowledge for one or more statements of the source code 114.

After obtaining results from the performance models, the security module 120 may then compare the results from the performance models to determine one or more of the security engines 126 that can implement the security mechanisms 106 most efficiently with respect to one or more statements of particular portions of the source code 114. In some cases, the security module 120 may determine a particular security engine 126 that can apply the security mechanisms 106 to a statement of the source code 114 in the least amount of time. In other instances, the security module 120 may determine the security engine 126 that can apply the security mechanisms 106 with respect to a statement of the source code 114 using the fewest operations. In an illustrative example, the security module 120 may compare a first amount of time taken for the first security engine 128 to apply the security mechanisms 106 to a statement of the source code 114 with a second amount of time taken for the second security engine 130 to apply the security mechanisms 106 to the statement of the source code 114. The security module 120 may determine that the first security engine 128 is to apply the security mechanisms 106 to the statement of the source code 114 when the first amount of time is less than the second amount of time.

Additionally, at 136, the security module 120 may generate input code 138 for a particular security engine 126 that has been selected to apply the security mechanisms 106 to one or more statements of the source code 114. In some cases, the security module 120 may generate the input code 138 for a particular security engine 126 after determining that the particular security engine 126 will most efficiently implement the security mechanisms 106 with respect to the one or more statements of the source code 114. In a particular implementation, the security module 120 may generate the input code 138 for the particular security engine 126 by translating the one or more statements of the source code 114 for which to apply the security mechanisms 106 to expressions that are readable by the particular security engine 126. In one example, code readable by the particular security engine 126 may be expressed in a computer programming language that is different from the computer programming language of the source code 114. In these situations, the security module 120 may translate the source code into code readable by the particular security engine 126.

Further, at 140, the security module 120 may determine one or more computing devices to execute operations associated with the application 102. For example, the security module 120 may determine that a first set of operations associated with the application 102 are to be executed by the first computing device 104 and that a second set of operations associated with the application 102 are to be executed by the second computing device 110. In an implementation, the security module 120 may determine a computing device from among a number of computing devices to perform operations of the application 102 based, at least in part, on resources of each of the respective number of computing devices. To illustrate, the security module 120 may determine a computing device to perform operations of the application 102 according to processing resources of the computing device, memory resources of the computing devices, or both. In a particular example, the security module 120 may determine that computationally intensive operations are to be assigned to a computing device having a larger amount of processing and/or memory resources to reduce the amount of time taken to perform the operations. The security module 120 may also determine a computing device to perform operations of the application 102 based, at least in part, on an amount of time to communicate information between the respective number of computing devices and the security module 120. In one illustrative example, the security module 120 may be stored on the first computing device 104 and the security module 120 may determine that particular operations related to the application 102 are to be performed by the first computing device 104 because an amount of time taken to communicate information to a computing device that is remote from the security module 120, such as the second computing device 110, may be longer than an amount of time taken to communicate information to the first computing device 104.

In other situations, the security module 120 may determine a computing device to perform operations of the application 102 based, at least in part, on the security mechanisms 106. For example, the security module 120 may determine that applying the security mechanisms 106 may result in calculations associated with one or more variables of the application 102 and/or calculations associated with one or more functions of the application 102 being executed on the computing device that stores the application 102. In another example, the security module 120 may determine that implementing the security mechanisms 106 may result in calculations associated with one or more variables of the application 102 and/or calculations associated with one or more functions of the application being executed remotely from the computing device that stores the application 102.

In an implementation, the security module 120 may receive machine-readable code, such as machine-readable code 142, from one or more of the security engines 126 that is executable to implement the security mechanisms 106 with respect to portions of the source code 114 that are subject to the security mechanisms 106. In some cases, the machine-readable code may be executable to produce zero-knowledge proofs of knowledge for statements of the source code 114. The security module 120 may then provide the machine-readable code to one or more computing devices to be executed.

In an illustrative implementation, the security module 120 may parse the application 102 and determine that the source code portion 122 is specified by the security mechanism identifiers 116 as being subject to the security mechanisms 106. The security module 120 may then generate performance models for a number of the security engines 126 to apply the security mechanisms 106 to one or more statements of the source code section 122, such as the statement 124. Based on the results of the performance models, the security module 120 may determine that the first security engine 128 will most efficiently apply the security mechanisms 106 to the statement 124. Accordingly, the security module 120 may translate the statement 124 from a computer programming language of the source code 114 to a computer programming language readable by the first security engine 128 to produce the input code 138, and provide the input code 138 to the first security engine 128. In conjunction with applying the security mechanisms 106 to the input code 138 corresponding to the statement 124, the first security engine 128 may generate the machine-readable code 142, and provide the machine-readable code 142 to the security module 120. Further, the security module 120 may provide the machine-readable code 142 to a particular computing device for execution.

In an illustrative scenario, the security engine 120 may determine that the machine-readable code 142 is to be executed by the first computing device 104. The machine-readable code 142 may be related to providing a result of a computation specified by the statement 124 of the application 102. In addition, the result of the computation may be utilized by the second computing device 110 to perform another calculation. Accordingly, the first computing device 104 may send the result of the computation to the second computing device 110. In some cases, the first computing device 104 may also send a proof associated with the calculation to the second computing device 110. Thus, the second computing device 110 may trust the result of the computation performed by the first computing device 104 with respect to the statement 124 because the first security engine 128 applied the security mechanisms 106 to the statement 124. In this way, the security module 120 may efficiently provide a computation result to the second computing device 110 that can be trusted, while taking advantage of the strengths of certain security engines 126 to optimally apply the security mechanisms 106 to various types of statements of the application 102.

Example Source Code

FIG. 2 illustrates example source code 200 for an application that is executed in association with security techniques to enforce privacy processes and integrity processes according to some implementations. The source code 200 includes expressions of a variation of the C# computer programming language. In particular, the source code 200 includes a first security mechanism identifier 202 and a second security mechanism identifier 204. The first security mechanism identifier 202 may indicate the beginning of a section 206 of the source code 200 that is subject to security mechanisms, such as the security mechanisms 106 of FIG. 1. In addition, the second security mechanism identifier 204 may indicate the end of the section 206 of the source code 200 that is subject to the security mechanisms.

The source code 200 also includes a number of location identifiers 208, 210, 212, 214. The location identifiers 208, 210, 212, 214 specify a location where a function is to be executed, a location where a value for a variable is to remain until security mechanisms are applied to the value of the variable, or both. In a particular example, the location identifier 208 specifies that values for the variable shophist are to remain on a client device until security mechanisms are applied to the values for the shophist variable. In another example, the location identifier 210 specifies that values for the variable items are to remain on the client device until security mechanisms are applied to the values for the items variable. In an additional example, the location identifier 212 specifies that the expressions associated with the GetDiscounts function are to be executed on the client device, while the location identifier 214 specifies that the expressions associated with the ApplyDiscount function are to be executed by a computing device external to the client device.

The source code 200 may also include features that are not included in standard C# source code. To illustrate, the source code 200 includes a Pair type specified by an expression 216 and a Triple type specified by an expression 218. In some implementations, the Pair type and the Triple type may be utilized in the source code 200 in place of another type associated with standard C# source code, such as the System.Tuple types.

Example System

Figure 3:
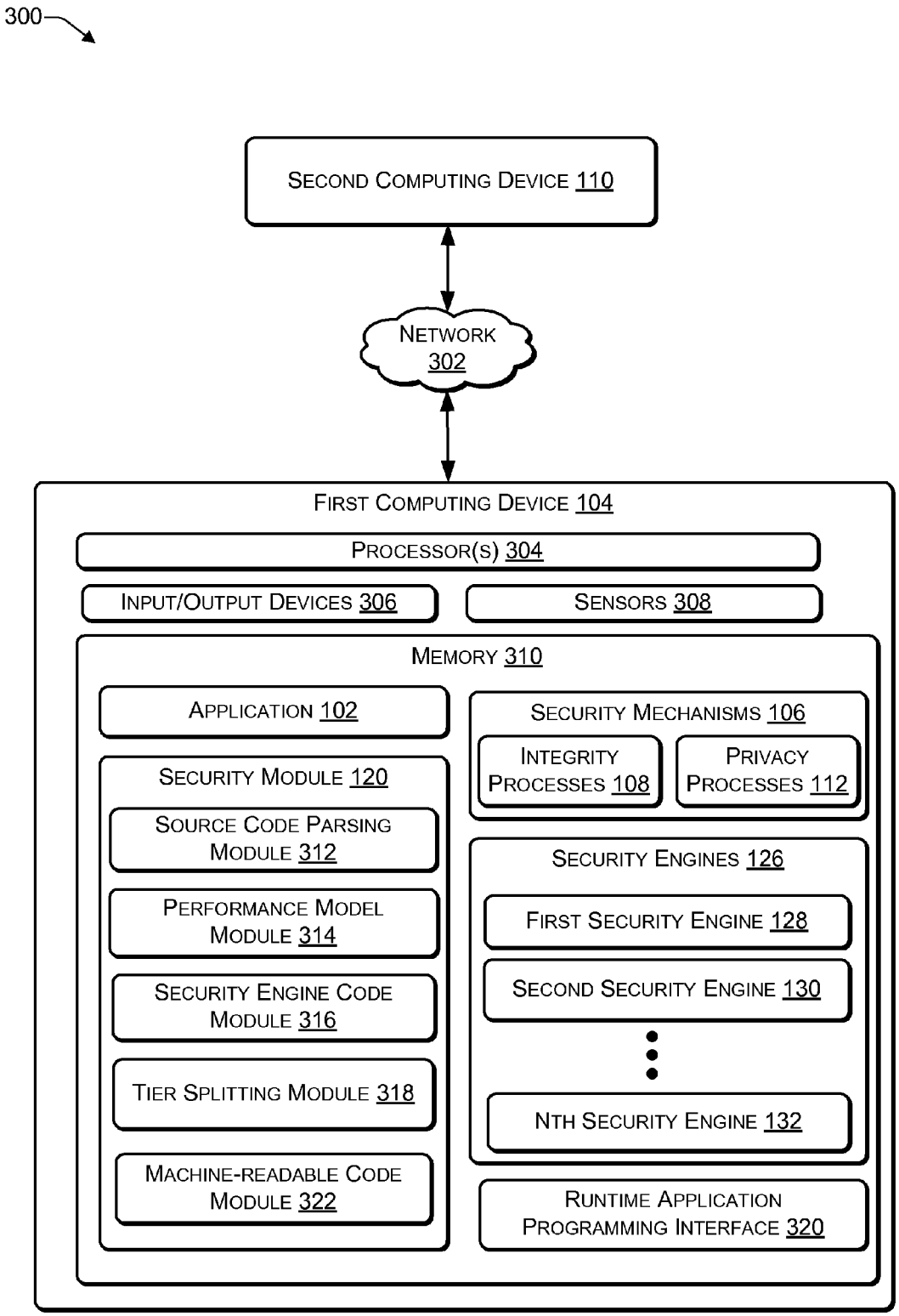
FIG. 3 illustrates an example system to implement privacy processes and integrity processes for an application according to some implementations.

FIG. 3 illustrates an example system 300 to enforce privacy processes and integrity processes for an application according to some implementations. The system 300 may include the first computing device 104 and the second computing device 110. The first computing device 104 and the second computing device 110 may communicate via a network 302. The network 302 may be representative of any one or combination of multiple different types of wired and wireless networks, such as the Internet, cable networks, satellite networks, wide area wireless communication networks, wireless local area networks, wired local area networks, and public switched telephone networks (PSTN).

The first computing device 104 may include one or more hardware processor devices represented by processor 304. The first computing device 104 may also include one or more input/output devices 306, such as a keyboard, a mouse, a touch screen, a display, speakers, a microphone, a camera, combinations thereof, and the like. In addition, the first computing device 104 may include one or more sensors, such as a location sensor (e.g., GPS sensor), an accelerometer, a physical property sensor (e.g., thermometer, pressure sensor), a body sensor, combinations thereof, and the like.

The first computing device 104 may also include one or more physical memory devices represented by memory 310. The memory 310 may store an application 102 that is executable by the processor 304 to perform a number of specified operations. In some cases, the application 102 may include a word processing application, a spreadsheet application, an entertainment application, a retail application, an educational application, a data tracking application, combinations thereof, and the like.

The memory 310 may also store the security mechanisms 106 that may implement the integrity processes 108 and the privacy processes 112. The integrity processes 108 may be applied to certify that results of calculations performed with respect to the application 102 are accurate, and the privacy processes 112 may be applied to ensure that data and/or calculations associated with the application 102 are confidential. Further, the memory 310 may store a number of security engines 126, such as the first security engine 128, the second security engine 130, and up to an $N^{th}$ security engine 132. In one implementation, the first security engine 128 may utilize zero-knowledge query language (ZQL) security techniques and the second security engine 130 may utilize security techniques associated with the Pinocchio security engine.

In addition, the memory 310 may include the security engine module 120 that is executable by the processor 304 to apply the security mechanisms 106 to particular portions of the application 102. In some cases, the portions of the application 102 that are subject to the security mechanisms 106 may be identified by the security engine module 120 by security mechanism identifiers embedded in source code of the application 102. In an implementation, the security engine module 120 includes a source code parsing module 312 that is executable by the processor 304 to parse source code of applications and identify portions of the source code that are subject to the security mechanisms 106. In some cases, the source code parsing module 312 may also identify location identifiers that specify one or more particular computing devices that are authorized to perform calculations with respect to particular functions of applications and/or one or more computing devices that have access to values of particular variables of applications.

The security engine module 120 also includes a performance model module 314 that is executable by the processor 304 to build performance models for a plurality of the security engines 126 with respect to applying the security mechanisms 106 to statements of source code of applications identified by the source code parsing module 310. The performance models may be evaluated to determine a cost associated with applying the security mechanisms 106 to one or more statements of the application 102. The cost associated with applying the security mechanisms 106 to a statement of the application 102 may be expressed as a number of operations performed to apply the security mechanisms 106 to the statement. In other instances, the cost associated with applying the security mechanisms 106 to a statement of the application 102 may be expressed as an amount of time to perform operations performed to apply the security mechanisms 106 to the statement. Additionally, the respective performance models may indicate a cost for the corresponding security engines 126 to apply the security mechanisms 106 to a statement of the application for the computing device applying the security mechanisms 106 to the statement and a cost for an additional computing device, such as the second computing device 110, to verify that the security mechanisms 106 have been applied to the statement of the application 102. In a particular implementation, the performance models may indicate a cost to build and verify zero-knowledge proofs of knowledge for one or more statements of the application 102.

In some cases, building the performance models for statements of source code that are subject to the security mechanisms 106 may include generating polynomials for the statements of the application 102 that are subject to the security mechanisms 106. The polynomials may be evaluated over the size of the input data associated with one or more statements of the application 102 subject to the security mechanisms 106. In various implementations, the polynomials may include variables that represent the size of the input data over the statements subject to the security mechanisms 106, variables that represent a cost of primitive operations performed by a respective security engine 126 to apply the security mechanisms 106 to particular statements of the application 102, or both. In a particular implementation, the performance models may be evaluated without utilizing unbounded recursion and the performance models may not consider branching behavior in determining the order in which statements are executed. Thus, looping behavior of each portion of the application 102 that is subject to the security mechanisms 106 is merely a function of the size of the input provided to the respective portions of the application 102 subject to the security mechanisms 106.

In some cases, the performance models may be generated by symbolically accumulating terms on a polynomial for operations included in the code input to a particular security engine 126. The terms of the polynomial may be considered symbolic as the terms are not initially given a value and are thus manipulated as symbols. In these situations, the symbolic data is represented by polynomials that characterize the size of input data to one or more particular statements of the application 102 subject to the security mechanisms 106. Additionally, symbolic structured data types may be represented as structured sets of polynomials. In other implementations, the performance models can include polynomials that indicate a cost of evaluating particular circuit representations that are used to apply the security mechanisms 106 to particular statements of the application 102. In particular, the polynomials may be static polynomials that represent the number of primitive operations to execute a circuit representation with a given number of input/output wires and multiplication gates.

The memory 310 also stores a security engine code module 316 that is executable by the processor 304 to translate portions of source code of the application 102 that are subject to the security mechanisms 106 into code that is readable by a particular security engine 126. The particular security engine 126 may be the security engine 126 that the performance model module 314 determined would most efficiently apply the security mechanisms 106 to specified portions of the application 102. In an implementation where the first security engine 128 is to apply the security mechanisms 106 to one or more statements of the application 102, the security engine code module 316 may translate the one or more statements to metalanguage (ML). Additionally, in situations where the second security engine 130 is to apply the security mechanisms 106 to one or more statements of the application 102, the security engine code module 316 may translate the one or more statements to a C computer programming language. In some cases, the translated code may be stored as a separate module that is callable by the application 102.

Additionally, the memory 310 stores a tier splitting module 318 that is executable by the processor 304 to determine particular computing devices to execute portions of the application 102. For example, the tier splitting module 318 may determine that a first number of statements of the application 102 are to be executed by the first computing device 104 and a second number of statements of the application 102 are to be executed by the second computing device 110. In an implementation, an application programming interface, such as the runtime application programming interface 320, may be called by the application 102 to perform the communication of data between computing devices and for the synchronization of the communications between computing device in conjunction with the execution of statements of the application 102. In various implementations, the communications between computing devices may be encrypted.

In some cases, the tier splitting module 318 may determine a computing device to execute statements of a portion of the application 102 based, at least in part, on a number of operations performed by the computing device to execute statements of the portion of the application 102. The tier splitting module 318 may also determine a computing device to execute statements of a portion of the application 102 based, at least in part, on an amount of time taken to execute the statements of the portion of the application 102. In addition, the tier splitting module 318 may determine a computing device to execute statements of a portion of the application 102 based, at least in part, on an amount of time to transmit data to one or more computing devices in conjunction with executing the statements of the portion of the application 102.

The tier splitting module 318 may determine a computing device to execute statements of a portion of the application 102 according to the security mechanisms 106. For example, the privacy processes 112 may specify that particular statements of the application 102 and/or that operations associated with particular variables of the application 102 are to be executed by a particular computing device. In another example, the tier splitting module 318 may determine a computing device to execute statements of a portion of the application 102 according to location identifiers included in source code of the application 102, where the location identifiers specify that particular statements of the application are to be executed by a particular computing device, that operations performed with respect to particular variables of the application are to be executed by a particular computing device, or both.

Further, the memory 310 stores a machine-readable code module 322 that is executable by the processor 304 to generate machine-readable code from source code of the application 102. The machine-readable code module 322 may also obtain machine-readable code from the security engines 126 that has been generated to apply the security mechanisms 106 to portions of the application 102. In a particular implementation, the machine-readable code module 322 may perform compiler operations with respect to the execution of code of the application 102.

In addition, the machine-readable code module 322 may provide additional machine-readable code to assist in the execution of statements of the application 102. For example, the machine-readable code module 322 may provide machine-readable code corresponding to operations associated with the communication of information between computing devices as determined by the tier splitting module 318. To illustrate, the tier splitting module 318 may determine that a number of statements of the application are to be executed by the second computing device 110, and the machine-readable code module 322 may provide machine-readable code to facilitate the communication of the number of statements to the second computing device 110. In some cases, the machine-readable code module 322 may generate calls to the runtime application programming interface 320 to communicate information to additional computing devices and to synchronize the communications between the first computing device 104 and the additional computing devices.

In an implementation, the machine-readable code module 322 may send at least a portion of the machine-readable code received from one or more of the security engines 126 to additional computing devices. In one example, the tier splitting module 318 may determine that results of computation performed with respect to portions of the application 102 that are subject to the security mechanisms 106 may be utilized by the second computing device 110. In this situation, the machine-readable code module 322 may receive particular machine-readable code from the security engine 126 that applied the security mechanisms 106 to a portion of the application 102 and then send the particular machine-readable code received from the security engine 126 to the second computing device 110. In an alternative situation, the machine-readable code module 322 may generate a call for the runtime application programming interface 320 to send the particular machine-readable code received from the security engine 126 to the second computing device 110.

In an illustrative implementation, the application 102 may be related to tracking the physical exercise of a user of the first computing device 104 such that the user can obtain a reward based on the physical exercise of the user. In this situation, the source code of the application 102 may include security mechanism identifiers specifying that certain calculations of the application 102 are to be subject to the security mechanisms 106. For example, the source code of the application 102 may include security mechanism identifiers specifying statements of the application 102 directed to computing an amount of exercise performed by the user of the application 102, such as a distance walked by the user, a distance run by the user, and/or a distance biked by the user, are subject to the security mechanisms 106. In this way, when the results of the calculations are provided to an additional computing device, such as the second computing device 110, the results are verifiable and can be trusted. Thus, the user of the computing device 102 is unable to manipulate the results of the calculations to obtain a greater reward. The source code of the application 102 may also include location identifiers indicating that values of specified variables are to remain on the first computing device 104. To illustrate, the source code of the application 102 may include location identifiers specifying that sensor readings associated with the application 102, such as GPS location data, is to remain on the first computing device 104 and be inaccessible to additional computing devices. Accordingly, the privacy of the user of the application 102 can be maintained by not sharing the location of the user with other entities.

Example Processes

Figure 5:
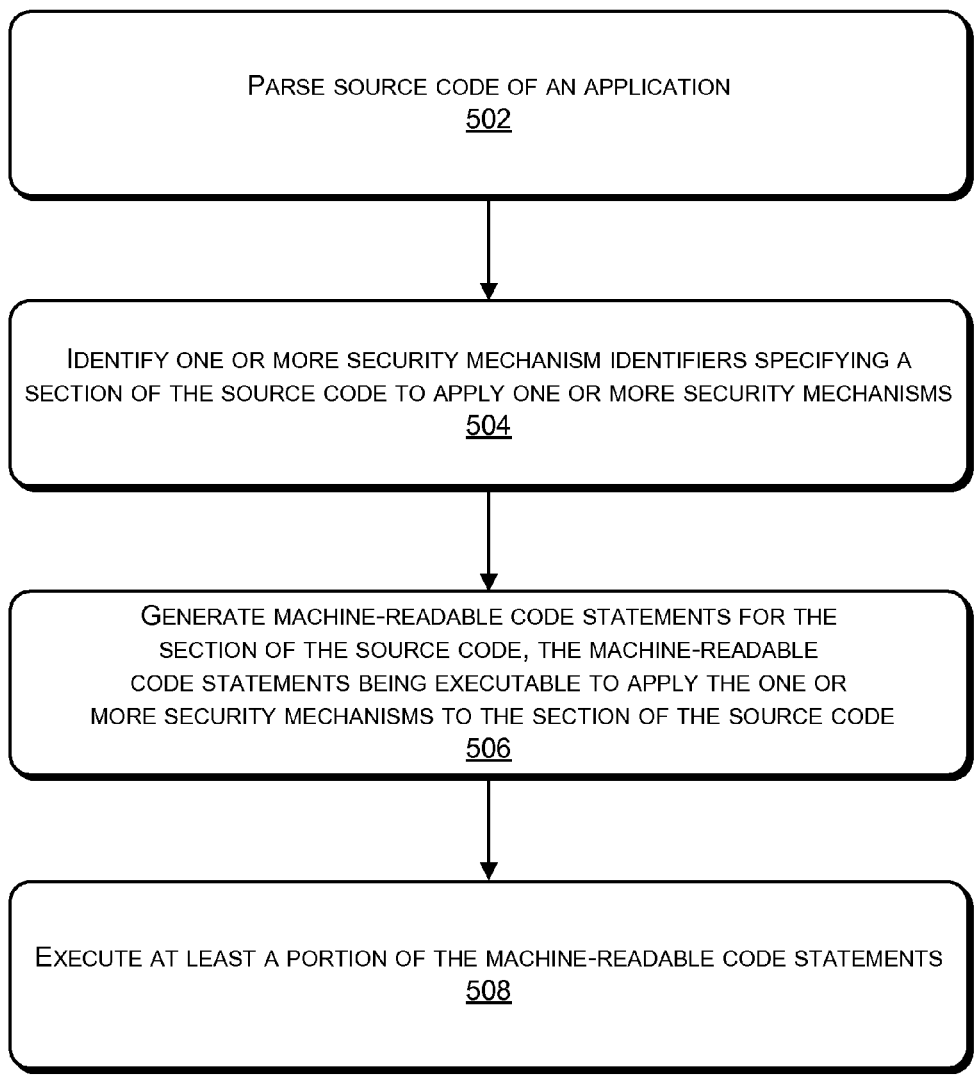
FIG. 5 illustrates a flow diagram of an example method to identify a section of source code for which to apply one or more security mechanisms according to security identifiers included in the source code according to some implementations.
Figure 6:
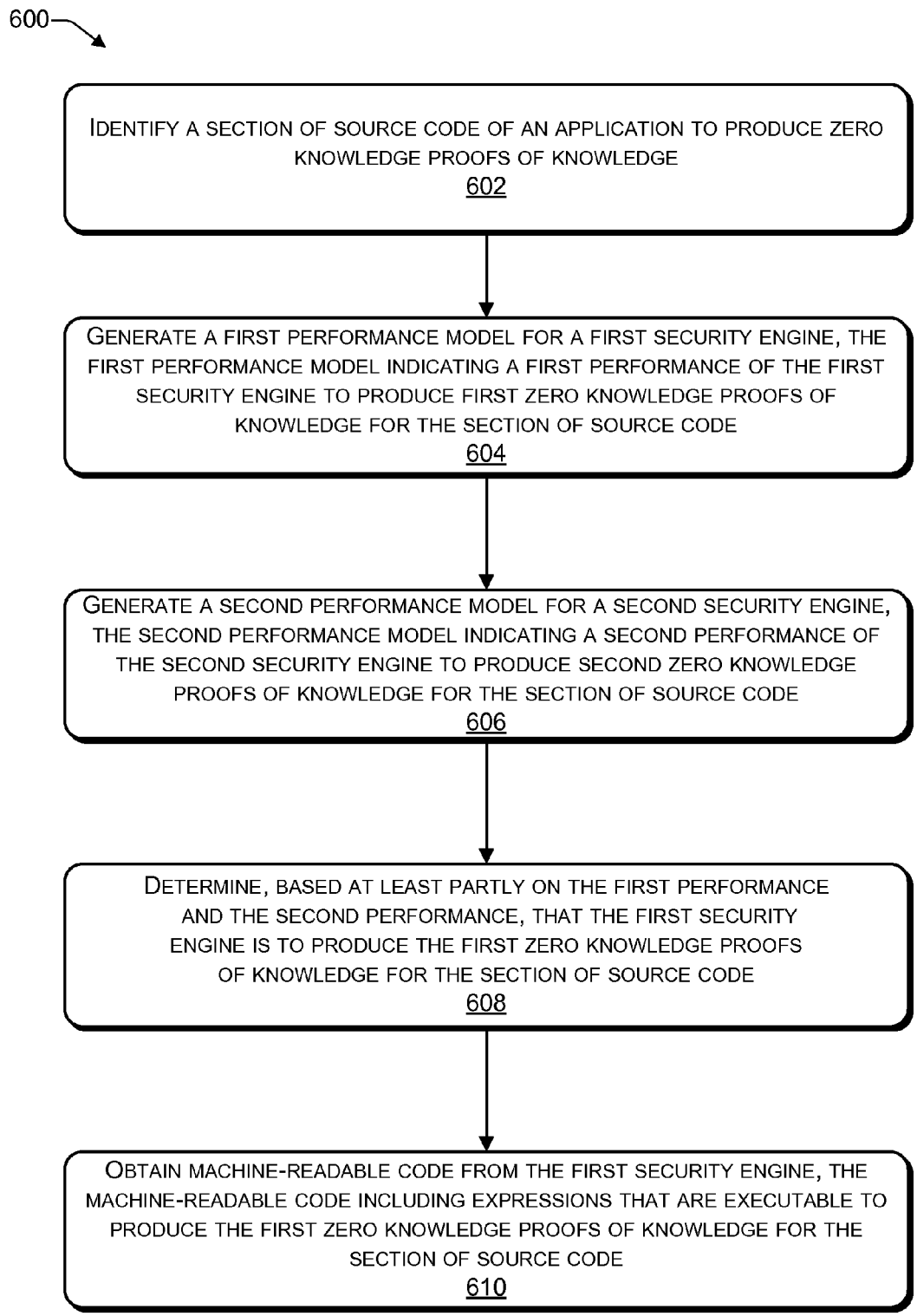
FIG. 6 illustrates a flow diagram of an example process to generate performance models for producing zero-knowledge proofs of knowledge for a section of source code and determine a security engine to produce the zero-knowledge proofs of knowledge to the section of source code based on the performance models according to some implementations.

In the flow diagrams of FIGS. 4, 5, and 6, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 400, 500 and 600 are described with reference to the framework 100 and the system 300, described previously, although other models, frameworks, systems and environments may be used to implement these processes.

FIG. 4 illustrates a flow diagram of an example method 400 to determine a security engine of a plurality of security engines to apply one or more security mechanisms to a section of source code according to some implementations. At 402, the method 400 may include identifying a section of source code of an application for which to apply one or more security mechanisms. In some cases, the section of the application for which to apply the one or more security mechanisms may be designated by particular identifiers included in the source code.

At 404, the method 400 may include determining that a security engine of a plurality of security engines is to apply the one or more security mechanisms to the section of source code. In some cases, a security module may determine that the security engine is to apply the one or more security mechanisms to the section of the source code based, at least in part, on a respective performance of each of the plurality of security engines. The respective performance of each of the security engines with respect to applying the one or more security mechanisms to the section of the source code may indicate an estimate of an amount of time and/or a number of operations for a corresponding security engine to apply the one or more security mechanisms to the section of the source code.

At 406, the method 400 may include obtaining machine-readable code statements from the security engine. The machine-readable code statements may be executable to implement the one or more security mechanisms with respect to the section of the source code. In some situations, implementing the one or more security mechanisms with respect to the section of the source code may include the security engine generating zero-knowledge proofs of knowledge for the section of the source code.

In an implementation, the security engine may generate the machine-readable code statements after receiving input code from a security module that identified the section of source code subject to the one or more security mechanisms. In a particular implementation, the security module may include a compiler that translates the source code into additional code expressed in an input language that is readable by the security engine. For example, the section of source code subject to the one or more security mechanisms may be expressed in a first computer programming language, while the security engine is configured to read code expressed in a second computer programming language.

At 408, the method 400 may include determining that a first portion of the machine-readable code statements are to be executed by the first computing device and a second portion of the machine-readable code statements are to be executed by the second computing device. In an implementation, determining that the first portion of the machine-readable code statements are to be executed by the first computing device and the second portion of the machine-readable code statements are to be executed by the second computing device may include determining a first cost for a first computing device to execute one or more statements of the machine-readable code and determining a second cost for a second computing device to execute the one or more statements of the machine-readable code. In some situations, the first cost and the second cost may include estimates of a number of operations for the first computing device and the second computing device to execute the one or more statements of the machine-readable code. In other cases, the first cost and the second cost may include estimates of an amount of time for the first computing device and the second computing device to execute the one or more statements of the machine-readable code. The first cost and the second cost may also be based, at least in part, on an amount of time to communicate the one or more statements of the machine-readable code to the first computing device and/or the second computing device.

In a particular implementation, a runtime application programming interface may be used to produce first additional machine-readable code that is executable to send the second portion of the machine-readable code to the second computing device. Additionally, the runtime application programming interface may be used to produce second additional machine-readable code that is executable to synchronize communications between the first computing device and the second computing device with respect to execution of the first portion of the machine-readable code and execution of the second portion of the machine-readable code. In some cases, the first additional machine-readable code, the second additional machine-readable code, or both may be executable by the first computing device. In other situations, at least a portion of the second additional machine-readable code may be executable by the second computing device.

FIG. 5 illustrates a flow diagram of an example method 500 to identify a section of source code for which to apply one or more security mechanisms according to security identifiers included in the source code according to some implementations. At 502, the method 500 may include parsing, by a computing device including a processor device, source code of an application. At 504, the method 500 includes identifying, by the computing device, one or more security mechanism identifiers specifying a section of the source code to apply one or more security mechanisms. In an implementation, the one or more security mechanism identifiers may include a first security mechanism identifier indicating a beginning of the section of the source code to apply the one or more security mechanisms, and a second security mechanism identifier indicating an end of the section of the source code to apply the one or more security mechanisms. The section of source code identified by the computing device may also include a first location identifier indicating a particular computing device on which to execute particular statements of the source code, and a second location identifier indicating that values for a variable of the source code are to remain on the computing device until the one or more security mechanisms are applied to the section of the source code.

At 506, the method 500 may include generating, by the computing device, machine-readable code statements for the section of the source code. The machine-readable code statements may be executable to implement the one or more security mechanisms with respect to the section of the source code. In an implementation, at least a portion of the machine-readable code statements may correspond to zero-knowledge proofs of knowledge for the section of the source code.

In some cases, the machine-readable code statements may be generated by a security engine identified from among a plurality of security engines. The security engine may be identified based, at least in part, on the respective performance of each security engine of the plurality of security engines. The respective performance of each security engine may be determined using a respective performance model for each security engine of the plurality of security engines. The respective performance for each security engine of the plurality of security engines may indicate an estimate of an amount of time and/or a number of operations for each security engine to generate respective machine-readable code statements to apply the one or more security mechanisms to the section of source code.

At 508, the method 500 may include executing, by the processor device of the computing device, at least a portion of the machine-readable code statements. In a particular implementation, a first portion of the machine-readable code statements may be executed by the processor device of the computing device, and a second portion of the machine-readable code statements may be sent to an additional computing device.

FIG. 6 illustrates a flow diagram of an example method 600 to generate performance models for applying zero-knowledge proofs of knowledge to a section of source code and determine a security engine to apply the zero-knowledge proofs of knowledge to the section of source code based on the performance models according to some implementations. At 602, the method 600 may include identifying a section of source code of an application to produce zero-knowledge proofs of knowledge. At 604, the method 600 may include generating a first performance model for a first security engine. The first performance model may indicate a first performance of the first security engine to produce zero-knowledge proofs of knowledge for the section of source code. In an illustrative example, the first security engine may utilize a first framework to produce zero-knowledge proofs of knowledge that use a circuit representation of the section of source code.

At 606, the method 600 includes generating a second performance model for a second security engine. The second performance model may indicate a second performance of the second security engine to produce zero-knowledge proofs of knowledge for the section of source code. In another illustrative example, the second security engine may utilize a second framework to produce zero-knowledge proofs of knowledge that uses cryptographic primitives. In some situations, the first performance model may be expressed as a first polynomial and the second performance model may be expressed as a second polynomial.

In some scenarios, the first performance of the first security engine produced according to the first performance model may indicate an estimate of a first time for the first security engine to produce the zero-knowledge proofs of knowledge for the section of source code. In addition, the second performance of the second security engine produced according to the second performance model may indicate an estimate of a second time for the second security engine to produce the zero-knowledge proofs of knowledge for the section of source code.

At 608, the method 600 may include determining, based at least partly on the first performance and the second performance, that the first security engine is to produce zero-knowledge proofs of knowledge for the section of source code. In an implementation, determining that the first security engine is produce the zero-knowledge proofs of knowledge for the section of source code may include determining that the first security engine will produce the zero-knowledge proofs of knowledge for the section of source code in less time than the second security engine. In other cases, determining that the first security engine is produce the zero-knowledge proofs of knowledge for the section of source code may include determining that the first security engine will produce the zero-knowledge proofs of knowledge for the section of source code using fewer operations than the second security engine. Further, in some implementations, the second security engine may produce zero-knowledge proofs of knowledge for an additional section of the source code.

At 610, the method 600 may include obtaining machine readable code from the first security engine. The machine-readable code may include expressions that are executable to apply zero-knowledge proofs of knowledge for the section of source code. In an illustrative implementation, the first security engine may generate the machine readable code at least partly in response to receiving input code that corresponds to the section of source code that is subject to the security mechanisms. In some scenarios, the input code may be expressed in a computer programming language that is different from a computer programming language of the source code. In these cases, a compiler may translate the section of the source code from the computer programming language of the source code to the computer programming language of input code that is readable by the first security engine.

Example Computing Device and Environment

Figure 7:
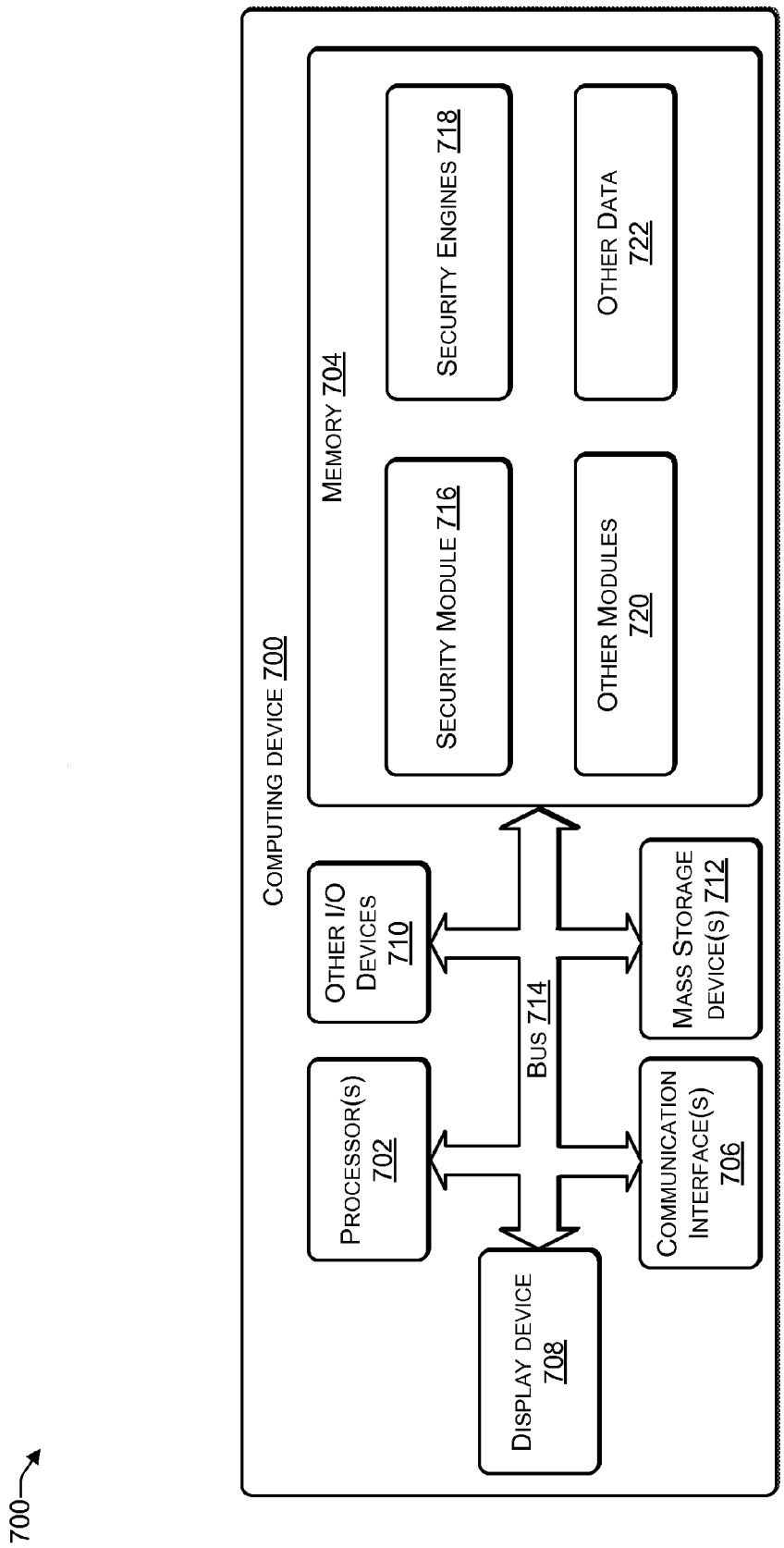
FIG. 7 illustrates an example computing device and environment according to some implementations.

FIG. 7 illustrates an example configuration of a computing device 700 and environment that can be used to implement the modules and functions described herein. The computing device 700 may include at least one processor 702, a memory 704, communication interfaces 706, a display device 708, other input/output (I/O) devices 710, and one or more mass storage devices 712, able to communicate with each other, such as via a system bus 714 or other suitable connection.

The processor 702 may be a single processing unit or a number of processing units, all of which may include single or multiple computing units or multiple cores. The processor 702 can be implemented as one or more microprocessors, microcomputers, microcontrollers, digital signal processors, central processing units, state machines, logic circuitries, and/or any devices that manipulate signals based on operational instructions. In some cases, the processor 702 may include a hardware device. Among other capabilities, the processor 702 can be configured to fetch and execute computer-readable instructions stored in the memory 704, mass storage devices 712, or other computer-readable media.

Memory 704 and mass storage devices 712 are examples of computer storage media for storing instructions which are executed by the processor 702 to perform the various functions described above. For example, memory 704 may generally include both volatile memory and non-volatile memory (e.g., RAM, ROM, or the like). Further, mass storage devices 712 may generally include hard disk drives, solid-state drives, removable media, including external and removable drives, memory cards, flash memory, floppy disks, optical disks (e.g., CD, DVD), a storage array, a network attached storage, a storage area network, or the like. Both memory 704 and mass storage devices 712 may be collectively referred to as memory or computer storage media herein, and may be media capable of storing computer-readable, processor-executable program instructions as computer program code that can be executed by the processor 702 as a particular machine configured for carrying out the operations and functions described in the implementations herein.

The computing device 700 may also include one or more communication interfaces 706 for exchanging data with other devices, such as via a network, direct connection, or the like, as discussed above. The communication interfaces 706 can facilitate communications within a wide variety of networks and protocol types, including wired networks (e.g., LAN, cable, etc.) and wireless networks (e.g., WLAN, cellular, satellite, etc.), the Internet and the like. Communication interfaces 706 can also provide communication with external storage (not shown), such as in a storage array, network attached storage, storage area network, or the like.

A display device 708, such as a monitor may be included in some implementations for displaying information and images to users. Other I/O devices 710 may be devices that receive various inputs from a user and provide various outputs to the user, and may include a keyboard, a remote controller, a mouse, a printer, audio input/output devices, and so forth.

Memory 704 may include modules and components for applying security mechanisms to sections of source code, such as producing zero-knowledge proofs of knowledge according to the implementations herein. In the illustrated example, the memory 704 includes a security module 716 and one or more security engines 718. Memory 704 may also include other data and data structures described herein, such as other data 720. Memory 704 may further include one or more other modules 722, such as an operating system, drivers, communication software, or the like. The other data 720 may include data stored while performing the functions described above and data used by the other modules 722.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Although illustrated in FIG. 7 as being stored in memory 704 of computing device 700, security module 716 and/or he security engines 718, or portions thereof, may be implemented using any form of computer-readable media that is accessible by computing device 700. As used herein, "computer-readable media" includes computer storage media and communication media.

Computer storage media includes volatile and non-volatile, removable and non-removable media implemented in any method or technology for storage of information, such as computer readable instructions, data structures, program modules, or other data. Computer storage media includes, but is not limited to, random access memory (RAM), read only memory (ROM), electrically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave. As defined herein, computer storage media does not include communication media.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification.

The invention claimed is:

1. A computing device comprising:
   one or more hardware processors; and
   one or more memory devices storing instructions, the instructions executable by the one or more processors to perform operations comprising:
   identifying a section of source code of an application to apply zero-knowledge proofs of knowledge;
   generating a first performance model for a first security engine, the first performance model indicating a first performance of the first security engine to produce first zero-knowledge proofs of knowledge for the section of source code;
   generating a second performance model for a second security engine, the second performance model indicating a second performance of the second security engine to produce second zero-knowledge proofs of knowledge for the section of source code;
   determining, based at least partly on the first performance and the second performance, that the first security engine is to produce the first zero-knowledge proofs of knowledge for the section of source code; and
   obtaining machine readable code from the first security engine, the machine-readable code including expressions that are executable to produce the first zero-knowledge proofs of knowledge for the section of source code.

2. The computing device of claim 1, wherein the section of source code is expressed in a first computer programming language, and the operations further comprise:
   translating the section of source code to an additional section of code expressed in a second computer programming language; and
   providing the additional section of code to the first security engine.

3. The computing device of claim 1, wherein the operations further comprise determining that the second security engine is to produce additional zero-knowledge proofs of knowledge for an additional section of source code.

4. The computing device of claim 3, wherein the first security engine utilizes a first framework to produce the first zero-knowledge proofs of knowledge for the section of source code, and the second security engine utilizes a second framework to produce the additional zero-knowledge proofs of knowledge for the additional section of the source code.

5. The computing device of claim 3, wherein the first security engine produces the first zero-knowledge proofs of knowledge utilizing a circuit representation of the section of source code, and the second security engine produces the additional zero-knowledge proofs of knowledge utilizing a number of cryptographic primitives.

6. The computing device of claim 1, wherein the first performance indicates a first time for the first security engine to produce the first zero-knowledge proofs of knowledge for the section of source code, and the second performance indicates a second time for the second security engine to produce the second zero-knowledge proofs of knowledge for the section of source code.

7. The computing device of claim 6, wherein determining that the first security engine is to produce the first zero-knowledge proofs of knowledge for the section of source code includes determining that the first time is less than the second time.

8. The computing device of claim 1, wherein the first performance model is expressed as one or more first polynomials and the second performance model is expressed as one or more second polynomials.

9. A method comprising:
parsing, by a computing device including a processor device, source code of an application;
identifying, by the computing device, one or more security mechanism identifiers included in the source code;
determining, by the computing device and based at least partly on the one or more security mechanism identifiers, a section of the source code for which to apply one or more security mechanisms;
identifying, by the computing device, one or more location identifiers in the source code;
determining, by the computing device and based at least partly on a location identifier of the one or more location identifiers, that values for a variable included in the section of the source code are to remain on the computing device and are to be inaccessible to additional computing devices until the one or more security mechanisms are applied to the section of the source code;
generating, by the computing device, machine-readable code statements for the section of the source code, the machine-readable code statements being executable to apply the one or more security mechanisms to the section of the source code; and
executing, by the processing unit of the computing device, at least a portion of the machine-readable code statements.

10. The method of claim 9, wherein the one or more security mechanism identifiers include a first security mechanism identifier indicating a beginning of the section of the source code to apply the one or more security mechanisms, and a second security mechanism identifier indicating an end of the section of the source code to apply the one or more security mechanisms.

11. The method of claim 9, wherein at least a portion of the machine-readable code statements correspond to zero-knowledge proofs of knowledge for the section of the source code.

12. The method of claim 9, wherein a first portion of the machine-readable code statements are executed by the processor device of the computing device, and the method further comprises sending a second portion of the machine-readable code statements to an additional computing device.

13. The method of claim 9, further comprising:
determining a respective performance for each security engine of a plurality of security engines to generate respective machine-readable code statements for the section of the source code, the respective machine-readable code statements corresponding to applying the one or more security mechanisms to the section of the source code; and
identifying a security engine of the plurality of security engines to generate the machine-readable code statements for the section of the source code based, at least in part, on the respective performance of each security engine of the plurality of security engines.

14. The method of claim 9, further comprising generating a respective performance model for each security engine of the plurality of security engines, wherein a respective performance for each security engine of the plurality of security engines is determined according to the respective performance model associated with each security engine of the plurality of security engines.

15. The method of claim 14, further comprising determining, based at least in part on a respective performance for each security engine of the plurality of security engines, that a security engine of the plurality of security engines is to apply the one or more security mechanisms to the section of source code.

16. A system comprising:
one or more hardware processors; and
one or more memory devices storing instructions, the instructions executable by the one or more processors to perform operations comprising:
identifying a section of source code of an application for which to apply one or more security mechanisms;
generating one or more performance models for a plurality of security engines;
performing a comparison of a result of a first performance model of the one or more performance models with a result of a second performance model of the one or more performance models, wherein the first performance model corresponds to a first security engine and the second performance model corresponds to a second security engine;
determining, based at least in part on the comparison, that a security engine of the plurality of security engines is to apply the one or more security mechanisms to the section of source code;
obtaining machine-readable code statements from the security engine, the machine-readable code statements being executable to implement the one or more security mechanisms with respect to the section of the source code; and
determining that a first portion of the machine-readable code statements are to be executed by a first computing device and a second portion of the machine-readable code statements are to be executed by a second computing device.

17. The system of claim 16, wherein the operations further comprise:
executing, by the one or more hardware processors, the first portion of the machine-readable code statements, and
sending the second portion of the machine-readable code statements to an additional computing device.

18. The system of claim 16, wherein:
the section of source code is expressed in a first computer programming language,
the operations further comprise translating the section of source code into additional code expressed in a second computer programming language; and
the security engine includes a compiler to generate the machine-readable code from the additional code, and generating the machine-readable code includes producing zero-knowledge proofs of knowledge for the section of source code.

19. The system of claim 16, wherein determining that a first portion of the machine-readable code statements are to be executed by a first computing device and a second portion of the machine-readable code statements are to be executed by a second computing device includes:
   determining a first cost for the first computing device to execute one or more statements of the machine-readable code; and
   determining a second cost for the second computing device to execute the one or more statements of the machine-readable code.

20. The system of claim 16, wherein the one or more memory devices store a runtime application programming interface configured to:
   produce first additional machine-readable code to send the second portion of the machine-readable code to the second computing device; and
   produce second additional machine-readable code to synchronize communications between the first computing device and the second computing device with respect to execution of the first portion of the machine-readable code and execution of the second portion of the machine-readable code.

* * * * *